United States Patent [19]

Yokotani et al.

[11] Patent Number: 5,016,137

[45] Date of Patent: May 14, 1991

[54] MULTI-LAYER CERAMIC CAPACITOR

[75] Inventors: Yoichiro Yokotani, Suita; Hiroshi Kagata, Katano; Junichi Kato, Osaka; Kouichi Kugimiya, Toyonaka, all of Japan

[73] Assignee: Matsushita Electric Industrial Co., Ltd., Osaka, Japan

[21] Appl. No.: 443,167

[22] Filed: Nov. 30, 1989

[30] Foreign Application Priority Data

Dec. 5, 1988 [JP] Japan .................................. 63-307386
Jan. 23, 1989 [JP] Japan .................................... 1-13810

[51] Int. Cl.$^5$ ............................................. H01G 4/10
[52] U.S. Cl. .................................................... 361/321
[58] Field of Search ................................ 361/320, 321; 501/134–139; 264/61; 29/25.42; 252/62.9, 521

[56] References Cited

U.S. PATENT DOCUMENTS 4,283,753  8/1981  Burn .................................. 361/320 X
4,767,732  8/1988  Furukaiwa et al. ................. 501/137

Primary Examiner—Donald A. Griffin
Attorney, Agent, or Firm—Wenderoth, Lind & Ponack

[57] ABSTRACT

A multi-layer ceramic capacitor having a large capacitance comprising:
 (a) internal electrode layers whose thickness is y μm, and
 (b) ceramic dielectric layers, whose thickness is x μm, extending between the internal electrode layers, where x, y and x/y are defined by the formula $1.0 \leq x \leq 7.0$, $0.07 \leq y \leq 0.7$ and $10.0 \leq x/y \leq 100.0$ respectively.

6 Claims, No Drawings

MULTI-LAYER CERAMIC CAPACITOR

BACKGROUND OF THE INVENTION

This invention generally relates to a multi-layer ceramic capacitor, and particularly relates to multi-layer ceramic capacitors having large capacitance.

Recently, multi-layer ceramic capacitors have been widely used to meet the need for small-sized and large-capacitance capacitors. Conventional electrolytic capacitors generally have a large capacitance, but can not operate normally at high frequencies. The multi-layer ceramic capacitors also have large capacitances and can operate normally at high frequencies. Therefore, increasing capacitance and miniaturization have become strongly desired.

Increasing capacitance and miniaturization is attained by increasing the number of the electrode layers and decreasing the thickness of the dielectric layers, in conjunction with intensive development of high dielectric constant materials. However, increasing the number of electrode layers causes increased internal stress in a multi-layered structure, so that cracks through dielectric layers or delaminations at the electrode-dielectric interfaces tend to be generated. Moreover, increasing the number of electrode layers results in increased cost of the internal electrode materials per chip.

The proposed multi-layer ceramic capacitors and related matters concerning the above-mentioned problems are classified into three groups. The first group concerns the multi-layered structure or processing method decreasing internal stress. The second group concerns dielectric materials with a high dielectric constant. The third group concerns electrode materials with low cost.

Japanese Patent Laid-Open No. 55-83216 discloses a multi-layer ceramic capacitor which uses an internal electrode containing a dielectric ceramic powder. In the sintered body, the ceramic powder dispersed at the electrode-dielectric interface behaves as an anchor. This relates to the above-mentioned first group.

U.S. Pat. No. 4,265,668 discloses high dielectric constant materials based on Pb complex perovskite oxide. These have a high dielectric constant of up to 20000. This relates to the above-mentioned second group.

U.S. Pat. No. 4,752,858 discloses a multi-layer ceramic capacitor which uses copper as an internal electrode material. This relates to the above-mentioned third group.

In the known multi-layer ceramic capacitors, electrode materials must be sintered with dielectric ceramics, so the thickness of internal electrode materials was up to 2 micrometers. If the printed electrode mass was under 2 micrometers thickness equivalent mass, the electrode layers were divided into individual parts, so the electrical connection of the electrode layers disappeared and capacity of the multi-layer ceramic capacitor was decreased.

SUMMARY OF THE INVENTION

It is an object of this invention to provide a multi-layer ceramic capacitor which has a large capacity, low cost internal electrodes, and a high reliability.

In accordance with these objectives, two types of multi-layer ceramic capacitors have been prepared.

In one type of multi-layer ceramic capacitor, the thickness of internal electrode layer "y" is up to 0.07 $\mu$m, and the thickness ratio "x/y" of the dielectric layer to the internal electrode layer is up to 10, wherein "x" is the thickness of the dielectric layer.

The dielectric ceramics include an oxide containing a component A and component B. Component A is selected from group I of lead (Pb), calcium (Ca), strontium (Sr), and barium (Ba). Component B is selected from Group II of magnesium (Mg), nickel (Ni), zinc (Zn), copper (Cu), titanium (Ti), zirconium (Zr), niobium (Nb), tantalum (Ta), and tungsten (W). Component A includes at least lead and component B includes at least two of the substances in Group II.

The internal electrode layers are made of palladium or an alloy including palladium as a principal component, e.g. a Pb containing palladium alloy, preferably containing a $Pd_3Pb$ phase.

In another type of multi-layer ceramic capacitor, the internal electrode layer has small pores or narrow gap trenches dispersed throughout the electrode layer. The narrow gap trenches are dug from the end termination side of the layer to inner side of the layer. The ratio of the average diameter of the pores or the gaps of the trenches (z) to the thickness of the dielectric layers is below 1.0.

DESCRIPTION OF THE PREFERRED EMBODIMENTS

EXAMPLE 1

Materials A, B, C and D expressed by the following chemical formulas were used for ceramic dielectrics of multi-layer ceramic capacitors.

A: $Pb_{1.0}(Mg_{\frac{1}{3}}Nb_{\frac{2}{3}})_{0.7}Ti_{0.19}(Ni_{\frac{1}{2}}W_{\frac{1}{2}})_{0.11}O_3$ B: $Pb_{0.88}Sr_{0.15}(Zn_{\frac{1}{3}}Nb_{\frac{2}{3}})_{0.85}Ti_{0.15}O_{3.03} + MnO_2$ 0.35wt%

C: $Pb_{0.60}Ca_{0.45}(Mg_{\frac{1}{3}}Nb_{\frac{2}{3}})_{0.95}Zr_{0.05}O_{3.03}$ D: $Pb_{1.00}Ba_{0.03}(Mg_{\frac{1}{3}}Nb_{\frac{2}{3}})_{0.90}(Ni_{\frac{1}{3}}Ta_{\frac{2}{3}})_{0.05}(Cu_{\frac{1}{2}}W_{\frac{1}{2}})_{0.05}O_{3.03}$ Dielectric powder was produced in a conventional manner for manufacturing ceramics. The calcined dielectric powder was wet milled with 0.6mm diameter zirconia balls in an attrition mill. The average diameter of the milled powder was 0.10 $\mu$m, and it had a narrow size distribution. The milled powder was mixed with acrylic resin and organic solvent with 3mm diameter zirconia balls in a vibration mill. The acrylic resin serves as binder. The mixing ratio or quantity of the acrylic binder was 6 weight percent (wt%) with respect to the quantity of milled powder. The mixing ratio or quantity of the solvent was 70 wt% with respect to the milled powder. The resulting mixture was formed by a reverse roll coater into a sheet having a predetermined thickness on organic carrier films.

Palladium black powder was used for the internal electrode of the multi-layer ceramic capacitors. Palladium black powder was mixed with acrylic resin, solvent and dispersion agent oil by a three roll mill. In the mixture, the mixing ratio or quantity of the acrylic resin was 5 wt% with respect to the quantity of palladium black powder. The mixture ratio or quantity of solvent was 60 wt% with respect to the quantity of palladium black powder.

A pattern of the internal electrode was printed on the dielectric sheet in a gravure transcription process by the use of an electrode paste.

The predetermined number of dummy layers were pressed and fastened on the metallic plate. Then the dielectric sheets with internal electrodes were stacked 51 times, and the predetermined number of dummy layers were stacked again. The resultant assembly was laminated, and the laminated body was then cut and formed into chips.

The laminated body thus produced was placed with coarse magnesia powder within a ceramic boat, and then the specimens were heated to 350° C. at a rate of 35° C./hr; the binder and organic agent were burned out at that temperature for 6 hours.

The burned-out laminated bodies were buried into muffle powder in the ceramic container and the container was closed with a magnesia lid. The muffle powder was made of 25 wt% of calcined dielectric powder and 75 wt% of coarse magnesia powder. The closed container was inserted into a 60mm internal diameter aluminum tube in a furnace. After the aluminum tube was evacuated, $N_2$ gas with $O_2$ at 8 ppm was continuously supplied at 300 cc/min. into the aluminum tube. During continuous supply of the $N_2$ gas, the aluminum tube was heated to a predetermined temperature at a rate of 300° C./hr. The predetermined temperature for the specimens made from dielectric composition A is 1000° C., and the predetermined temperature for the specimens made from dielectric compositions B, C and D is 850° C. After the temperature was maintained at this preset temperature for 45 minutes, the aluminum tube was cooled at room temperature.

After sintering the stacked specimens, end terminations were formed by applying Ag metal grazed type electrode paste to the opposite end surface of the sintered chip from which the internal electrodes project, and it was fired at 700° C. for 10 minutes in air.

The size of the resulting laminated capacitor element was $3.2 \times 1.6 \times 1.25$mm. The effective area per layer was 2.97 mm$^2$.

The capacitances and the dielectric losses were measured under the condition where an AC voltage having an amplitude of 1 volt and a frequency of 1 kHz was applied across the capacitor element. The specific resistances were derived from voltages across the capacitor elements which occurred at one minute after the end of the application of a voltage 5 volts to the capacitor elements. The breakdown ratios were measured under the condition wherein a 50V DC voltage as applied to ten samples of each type. The life indexes were determined as survival numbers for ten samples after 200 hours of applied 5V DC voltage, at 80° C. in an 85% humidity atmosphere. After drying the specimens, if their specific resistances were up to $1 \times 10^7$ ohm, they were judged as surviving. The structure defect ratios were determined by the observations in cross-sections of the vertical plane of internal electrode layers. If a delamination or a crack was observed in the plane, the chip was judged as having a structural defect.

Table 1 indicates thickness and composition of dielectric layers and thickness of internal electrode layers (denoted by the numerals 1-23) of multi-layer ceramic capacitors of this invention. Table 2 indicates various characteristics of these samples, and contains data concerning capacitances, dielectric losses and specific resistivity at 20° C., breakdown ratios, life survival ratios, and structural defect ratios.

TABLE 1

| No. | Dielectric ceramic composition | thickness (μm) | Internal electrode thickness (μm) |
|---|---|---|---|
| *1 | A | 7.0 | 1.0 |
| 2 | A | 7.0 | 0.7 |
| 3 | A | 7.0 | 0.4 |

TABLE 1-continued

| No. | Dielectric ceramic composition | thickness (μm) | Internal electrode thickness (μm) |
|---|---|---|---|
| 4 | A | 7.0 | 0.07 |
| *5 | A | 7.0 | 0.03 |
| *6 | A | 3.0 | 0.7 |
| 7 | A | 3.0 | 0.3 |
| 8 | A | 3.0 | 0.1 |
| 9 | A | 3.0 | 0.07 |
| *10 | A | 3.0 | 0.03 |
| 11 | A | 1.0 | 0.1 |
| 12 | A | 1.0 | 0.07 |
| *13 | A | 1.0 | 0.03 |
| *14 | A | 0.7 | 0.07 |
| 15 | B | 5.0 | 0.5 |
| 16 | B | 5.0 | 0.2 |
| *17 | B | 5.0 | 0.03 |
| *18 | C | 1.0 | 0.2 |
| 19 | C | 1.0 | 0.07 |
| *20 | C | 0.7 | 0.05 |
| 21 | D | 5.0 | 0.7 |
| 22 | D | 5.0 | 0.2 |
| *23 | D | 0.7 | 0.05 |

Specimens with Nos. preceded by an asterisk (*) are outside the scope of the present invention.

TABLE 2

| No. | Capacitance 20° C. (nF) | Tan 20° C. (%) | Resistance 20° C. (ohm) | Breakdown Ratio 50 V (%) | Life Indexes 80° C., 85% RH 200 hr(%) | Structural Defect (%) |
|---|---|---|---|---|---|---|
| *1 | 3100 | 0.59 | $2 \times 10^9$ | 4 | 5 | 4 |
| 2 | 3550 | 0.55 | $5 \times 10^9$ | 1 | 0 | 0 |
| 3 | 3750 | 0.49 | $5 \times 10^9$ | 0 | 0 | 0 |
| 4 | 3010 | 0.84 | $6 \times 10^9$ | 0 | 0 | 0 |
| *5 | 1.5 | 1.25 | $5 \times 10^{12}$ | 0 | — | 0 |
| *6 | 7910 | 0.79 | $2 \times 10^9$ | 8 | 4 | 5 |
| 7 | 8450 | 0.77 | $2 \times 10^9$ | 0 | 1 | 0 |
| 8 | 8760 | 0.69 | $1 \times 10^9$ | 0 | 0 | 0 |
| 9 | 6120 | 1.41 | $3 \times 10^9$ | 0 | 0 | 0 |
| *10 | 0.8 | 1.25 | $4 \times 10^{12}$ | 0 | — | 0 |
| 11 | 19800 | 1.10 | $5 \times 10^8$ | 1 | 0 | 1 |
| 12 | 20500 | 1.25 | $4 \times 10^8$ | 0 | 1 | 0 |
| *13 | 0.4 | 2.25 | $5 \times 10^{12}$ | 0 | — | 0 |
| *14 | 19580 | 3.54 | $1 \times 10^8$ | 8 | 10 | 5 |
| 15 | 822 | 1.00 | $1 \times 10^{10}$ | 0 | 0 | 0 |
| 16 | 838 | 1.12 | $1 \times 10^{10}$ | 0 | 0 | 0 |
| *17 | 0.6 | 2.98 | $1 \times 10^{13}$ | 0 | — | 0 |
| *18 | 128 | 1.45 | $3 \times 10^{11}$ | 5 | 10 | 2 |
| 19 | 131 | 1.68 | $2 \times 10^{11}$ | 1 | 1 | 0 |
| *20 | 84 | 3.82 | $5 \times 10^{10}$ | 10 | 10 | 10 |
| 21 | 3130 | 0.39 | $5 \times 10^9$ | 0 | 0 | 0 |
| 22 | 5020 | 0.69 | $4 \times 10^9$ | 0 | 1 | 0 |
| *23 | 0.5 | 2.58 | $2 \times 10^{12}$ | 0 | — | 0 |

Specimens with Nos. preceded by an asterisk (*) are outside the scope of the present invention.
Data of the "—" marks in life indexes are not measured because of too little capacitance data.

The multi-layer ceramic capacitor of which the thickness of electrode layer, and the ratios of dielectric layer to electrode layer thickness are limited in the range of this invention have large capacitance, good agreement with calculations and have high reliability. The specimens having a dielectric-electrode thickness ratio of under 10 had some defects in dielectric-electrode interface, so breakdown trouble or life trouble occurred. In the specimens having under 0.07 μm thickness electrode, the internal electrode layers were divided into individual zones, so the capacitances were decreased.

In this Example, the internal electrodes consist of Pd metal phase observed by the X-ray diffraction technique.

EXAMPLE 2

Materials A and D expressed in EXAMPLE 1 were used for ceramic dielectrics of a multi-layer ceramic capacitor. The powder process, sheet forming process, internal electrode materials, printing process and stacking process were the same as those in EXAMPLE 1.

In the sintering process, specimens were sintered in air in this Example. Another process of sintering and the end termination forming process were the same as those in EXAMPLE 1.

The size of the resulting laminated capacitor element was $3.2 \times 1.6 \times 1.25$ mm. The effective area per layer was 2.97 mm$^2$.

The capacitances and dielectric losses were measured under conditions where an AC voltage having an amplitude of 1 volt and a frequency of 1 kHz was applied across the capacitor element. The specific resistances were derived from voltages across the capacitor elements which occurred one minute after the end of the application of 5 volts to the capacitor elements. The breakdown ratios were measured under conditions where an 100V DC voltage was applied to ten samples of each type. The life indexes were determined as survival numbers for ten samples after 200 hours of applied 12.5V DC voltage at 80° C. in an 85% humidity atmosphere. If the specific resistances were up to $1 \times 10^7$ ohm, it was judged as surviving. The structural defect ratios were determined by the observations for cross-sections of the vertical plane of internal electrode layers for ten samples.

Table 3 indicates various characteristics of these samples, and contains data concerning capacitances, dielectric losses and specific resistivity at 20° C., breakdown ratios, life survival ratios, and structural defect ratios.

TABLE 3

| Sample No./ Atm. | Capacitance 20° C. (nF) | Tan 20° C. (%) | Resistance 20° C. (ohm) | Breakdown Ratio 100 V (%) | Life Indexes 80° C., 85% RH 200 hr(%) | Structural Defects (%) |
|---|---|---|---|---|---|---|
| 7 N$_2$ | 8450 | 0.77 | $2 \times 10^9$ | 80 | 60 | 0 |
| 7 air | 8510 | 0.62 | $4 \times 10^9$ | 10 | 10 | 0 |
| 22 N$_2$ | 5020 | 0.69 | $4 \times 10^9$ | 60 | 30 | 0 |
| 22 air | 4360 | 0.51 | $6 \times 10^9$ | 20 | 0 | 0 |

Specimens of N$_2$ are the samples in EXAMPLE 1.

In this Example, the internal electrodes consist of Pb solid solution of Pd metal phase and Pd$_3$Pb phase as observed by the X-ray diffraction technique.

The specimens having an internal electrode with Pb containing Pd metal or Pd$_3$Pb phase were improved with respect to breakdown trouble and life indexes. In the heating stage of sintering, the internal electrode metal (Pd) was first oxidized and reacted with PbO to form the dielectric composition. The reacted complex oxide was liquid phase and got the surface of the dielectric layer wet. Then, according to rising temperature, the complex oxide was re-reduced. The re-reduced phase was a thin layered solid phase and well matched to the dielectric layer. Furthermore, generation of the liquid phase aided densification or vitrification of the dielectric surface. Thus, the reliability of multi-layer ceramic capacitors was improved.

In the specimens of Examples 1 and 2, thin layers of palladium internal electrodes were formed, so the total cost of internal electrode layers per chip were depressed.

EXAMPLE 3

Materials A in EXAMPLE 1 were used for ceramic dielectrics of multi-layer ceramic capacitors. The powder process and sheet processes of EXAMPLE 1 were employed. Palladium black powder was used for internal electrode materials. Some of the internal electrode paste was mixed with dielectric ceramic powder of 0.10 μm radius. The mixing ratio of the ceramic powder was 20 wt% with respect to the quantity of palladium. Palladium black powder only or palladium black powder and dielectric powder were mixed by a three roll mill with cellulose resin, solvent and dispersion agent oil. The mixing ratio was 10 wt% with respect to the quantity of inorganic powder. The mixing ratio of solvent was 80 wt% with respect to the quantity of inorganic powder.

A pattern of an internal electrode was printed on the dielectric sheet in a screen printing process or gravure transcription process. The screen mesh was selected for several levels and the gravure pattern was made of the line shape patterns dug from the end termination side to the inner side of internal electrode layers. The dielectric layers with internal electrode were stacked for 71 layers, other processes of stacking were the same as those in EXAMPLE 1.

In the sintering process, specimens were sintered at 000° C. for 2 hr in air in this Example. The end termination electrode forming process were the same as those in EXAMPLE 1.

The size of the resulting laminated capacitor element was $3.2 \times 1.6 \times 1.6$ mm. The effective internal electrode area per layer was 2.97 mm$^2$.

The capacitances and dielectric losses were measured under the condition where an AC voltage having an amplitude of 1 volt and a frequency of 1 kHz was applied across the capacitor element. The structural defect ratios were measured for ten samples by the observations for the cross-sections of the vertical plane of internal electrode layers.

Table 4 indicates thickness of dielectric layers, thickness of internal electrode layers, and pore radius or trench gap (denoted by the numerals 24-37) of multi-layer ceramic capacitors of this invention. Table 5, which indicates various characteristics of these samples, contains data regarding capacitances, covering ratio of internal electrode metal area to appearance are of the internal electrode, capacitance ratio to the samples having no pores and trenches in the internal electrode, dielectric losses and structural defect ratios.

TABLE 4

| No. | Dielectric layers (x) (μm) | Electrode layers (μm) | Pore or Trench | Radius or Gap (z)(μm) |
|---|---|---|---|---|
| *24 | 7 | 0.7 | — | — |
| 25 | 7 | 0.7 | pore | 2.2 |
| 26 | 7 | 0.7 | pore | 6.5 |

TABLE 4-continued

| No. | Dielectric layers (x) (μm) | Electrode layers (μm) | Pore or Trench | Radius or Gap (z)(μm) |
|---|---|---|---|---|
| *27 | 7 | 0.7 | pore | 8.5 |
| 28 | 7 | 0.7 | trench | 1.9 |
| 29 | 7 | 0.7 | trench | 6.5 |
| *30 | 7 | 0.7 | trench | 10.0 |
| *31 | 5 | 0.4 | — | — |
| 32 | 5 | 0.4 | pore | 1.4 |
| 33 | 5 | 0.4 | pore | 4.5 |
| *34 | 5 | 0.4 | pore | 9.1 |
| 35 | 5 | 0.4 | trench | 2.2 |
| 36 | 5 | 0.4 | trench | 4.1 |
| *37 | 5 | 0.4 | trench | 15.2 |

Specimens with Nos. preceded by an asterisk (*) are outside the scope of the present invention.

TABLE 5

| No. | Capacitance 20° C. (nF) | Covering ratio (%) | Capacitance ratio (%) | Structural defect ratio (%) |
|---|---|---|---|---|
| *24 | 4980 | 100 | 100 | 40 |
| 25 | 4825 | 92 | 97 | 0 |
| 26 | 4580 | 87 | 92 | 10 |
| *27 | 4330 | 85 | 87 | 0 |
| 28 | 4772 | 93 | 96 | 0 |
| 29 | 4712 | 92 | 95 | 0 |
| *30 | 4580 | 91 | 92 | 0 |
| *31 | 8300 | 100 | 100 | 80 |
| 32 | 7300 | 75 | 88 | 0 |
| 33 | 6800 | 72 | 82 | 0 |
| *34 | 6060 | 70 | 73 | 0 |
| 35 | 7055 | 77 | 85 | 10 |
| 36 | 6806 | 77 | 82 | 0 |
| *37 | 6475 | 77 | 78 | 0 |

Specimens with Nos. preceded by an asterisk (*) are outside the scope of the present invention.

In this example, the internal electrode consists of Pb solid solution of Pd metal phase and $Pd_3Pb$ phase observed by an X-ray diffraction technique.

The specimens having an internal electrode with small pores or trenches were improved with respect to structural defects. And in the specimens of which the ratios (z/x) were under 1.00, the capacitance ratio is over the covering ratio, so that the total costs of internal electrode per unit capacitance was reduced.

What is claimed is:

1. A multi-layer ceramic capacitor comprising,
   (a) internal electrode layers having many pores or trenches, in which the diameters of the pores and the gaps of the trenches are z μm.
   (b) ceramic dielectric layers, whose thickness is x μm, extending between the internal electrode layers, wherein z/x is defined by the formula, $z/x \leq 1.0$.

2. The multi-layer ceramic capacitor according to claim 1, wherein the thickness of the internal electrode layer is y μm, where x, y and x/y are defined by the formula $1.0 \leq x \leq 7.0$, $0.07 \leq y \leq 0.7$ and $10.0 \leq x/y \leq 100.0$ respectively.

3. The multi-layer ceramic capacitor according to claim 2, wherein the dielectric ceramics contain A and B, and the internal electrode layers are made of Pd or an alloy mainly comprising Pd, where A represents Pb with or without at least one element selected from the group consisting of Ca, Sr and Ba, B represents at least two elements selected from the group consisting of Mg, Ni, Zn, Cu, Ti, Zr, Nb, Ta and W.

4. The multi-layer ceramic capacitor according to claim 3, wherein the alloy contains Pb.

5. The multi-layer ceramic capacitor according to claim 4, wherein the alloy contains $Pd_3Pb$.

6. A multi-layered dielectric ceramic capacitor comprising: internal electrodes having a thickness of y and ceramic dielectric layers having a thickness of x extending between the internal electrode layers where x, y and x/y are defined as: $1.0 \leq x \leq 7.0$ in μm, $0.07 \leq y \leq 0.7$, in μm and $10 \leq x/y \leq 100$ respectively, wherein said dielectric ceramics contain A and B components and said internal electrode layer mainly comprises a Pd alloy containing at least a $Pd_3Pb$ phase, where A represents Pb and at least one element selected from the group consisting of Ca, Sr, and Ba, and B represents at least two elements selected from the group consisting of Mg, Ni, Zn, Cu, Ti, Zr, Ta and W.

* * * * *